(12) United States Patent
Wright

(10) Patent No.: US 8,707,640 B2
(45) Date of Patent: Apr. 29, 2014

(54) REMOVABLE BULKHEADS FOR BUILDING FIXTURES

(76) Inventor: Bosley Wright, Owings Mills, MD (US)

( * ) Notice: Subject to any disclaimer, the term of this patent is extended or adjusted under 35 U.S.C. 154(b) by 0 days.

(21) Appl. No.: 13/301,428

(22) Filed: Nov. 21, 2011

(65) Prior Publication Data

US 2012/0167498 A1 Jul. 5, 2012

Related U.S. Application Data

(60) Provisional application No. 61/458,304, filed on Nov. 19, 2010.

(51) Int. Cl.
*E04C 2/52* (2006.01)
(52) U.S. Cl.
USPC ...... 52/220.5; 52/287.1; 52/288.1; 52/506.06
(58) Field of Classification Search
USPC ........ 52/220.5, 506.01, 506.06, 287.1, 288.1, 52/DIG. 8, 848, 631
See application file for complete search history.

(56) References Cited

U.S. PATENT DOCUMENTS

| | | | | | |
|---|---|---|---|---|---|
| 316,715 | A | * | 4/1885 | Woelfle | 52/288.1 |
| 1,133,106 | A | * | 3/1915 | Cuppett | 52/783.1 |
| 1,671,084 | A | * | 5/1928 | Meyercord | 52/631 |
| 3,557,840 | A | * | 1/1971 | Maybee | 138/149 |
| 3,969,868 | A | * | 7/1976 | Bainter et al. | 428/201 |
| 4,704,837 | A | * | 11/1987 | Menchetti et al. | 52/631 |
| 5,526,617 | A | * | 6/1996 | Grice | 52/287.1 |
| 5,557,904 | A | * | 9/1996 | Dahowski | 52/631 |
| 5,652,039 | A | * | 7/1997 | Tremain et al. | 428/121 |
| 6,295,786 | B1 | * | 10/2001 | Lee | 52/745.19 |
| 7,451,576 | B2 | * | 11/2008 | Barone | 52/463 |
| 7,997,044 | B2 | * | 8/2011 | Green et al. | 52/834 |
| 2007/0151180 | A1 | * | 7/2007 | Pace et al. | 52/287.1 |

* cited by examiner

*Primary Examiner* — Brian Glessner
*Assistant Examiner* — Adam Barlow
(74) *Attorney, Agent, or Firm* — Thomas A. O'Rourke; Bodner & O'Rourke, LLP

(57) ABSTRACT

The present invention is directed towards a series of removable bulkheads which surround and protect immovable building fixtures such as sprinkler and plumbing lines, heating and ventilation ducts, electrical and telecommunications wiring. A single bulkhead is generally comprised of a vertical panel and a horizontal panel. The bulkheads attach to preexisting ceilings and walls and provide a quick and cost effective method of concealing fixtures and allow easy access to renovate or repair the fixtures.

19 Claims, 13 Drawing Sheets

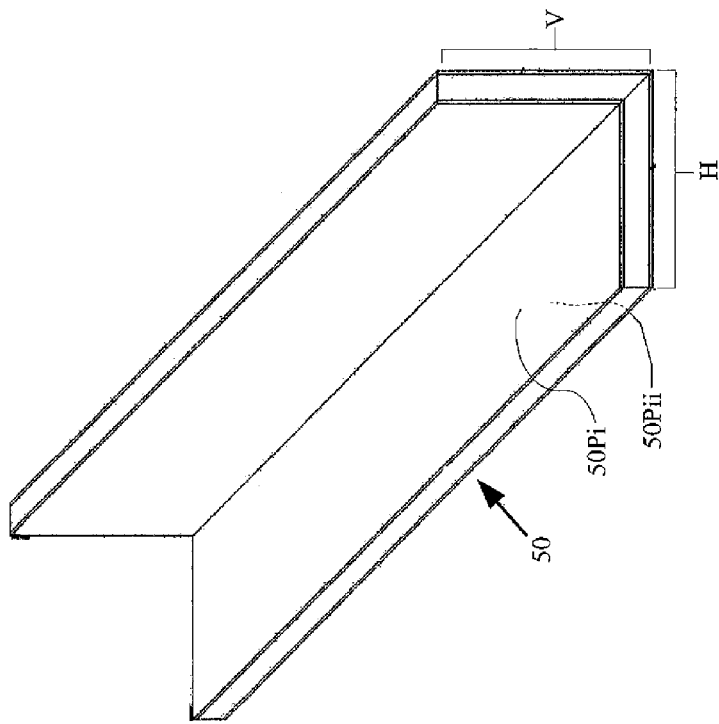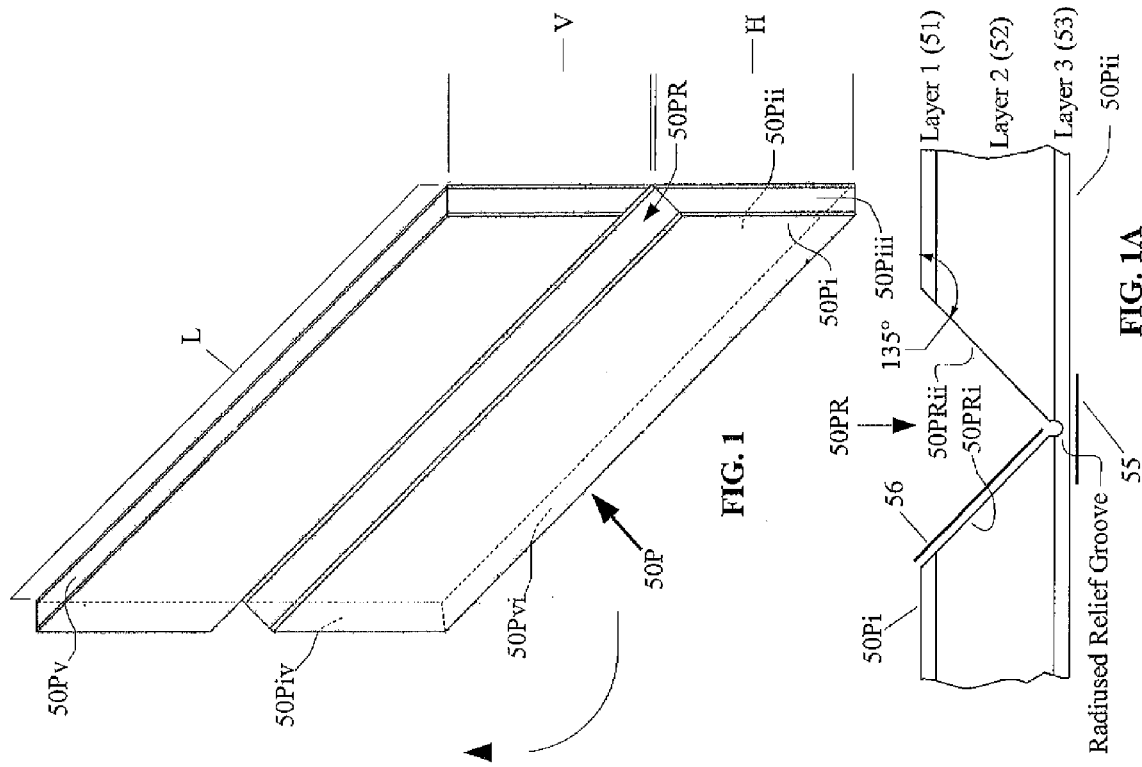

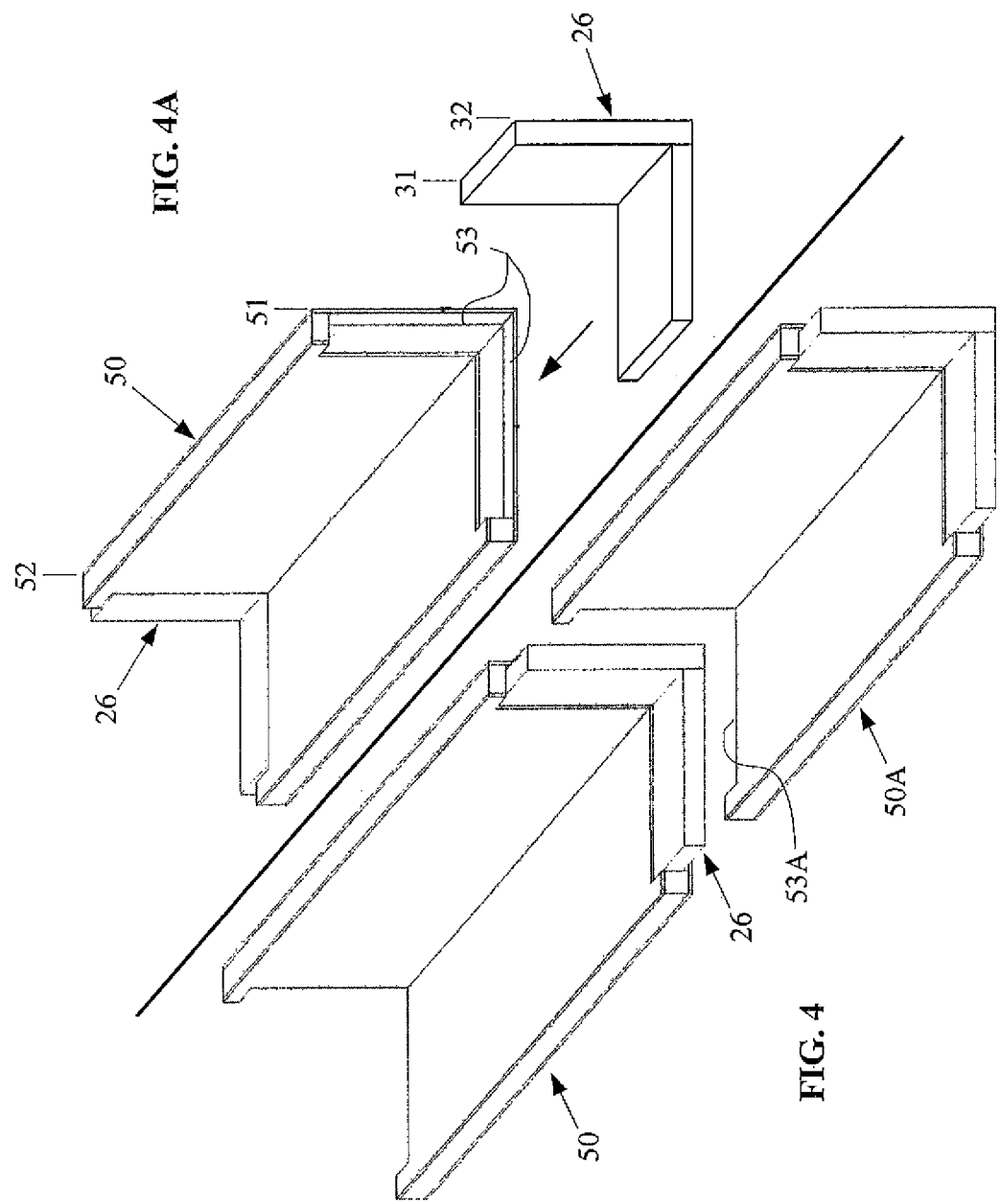

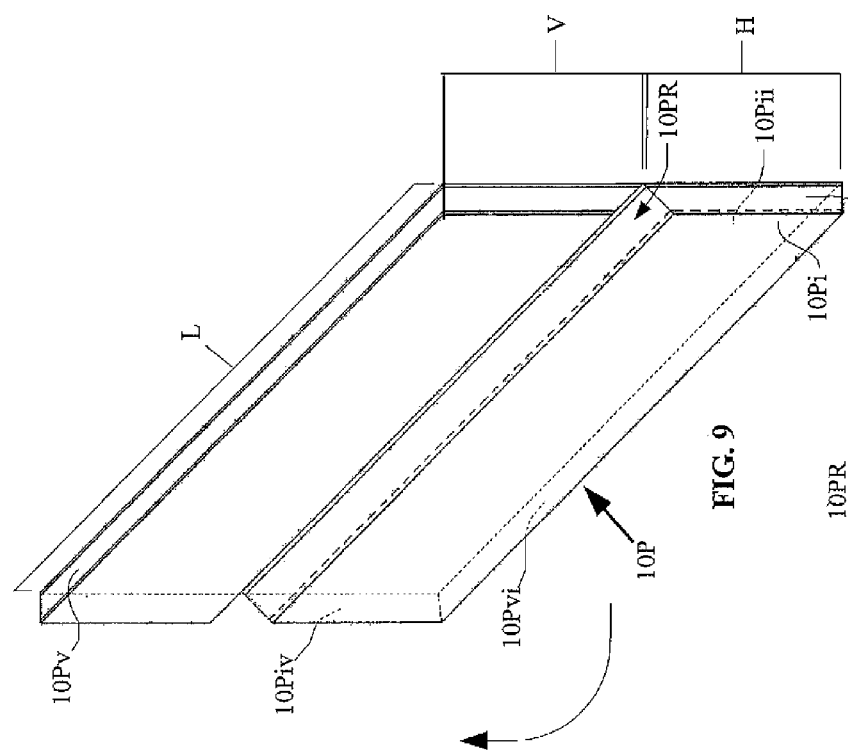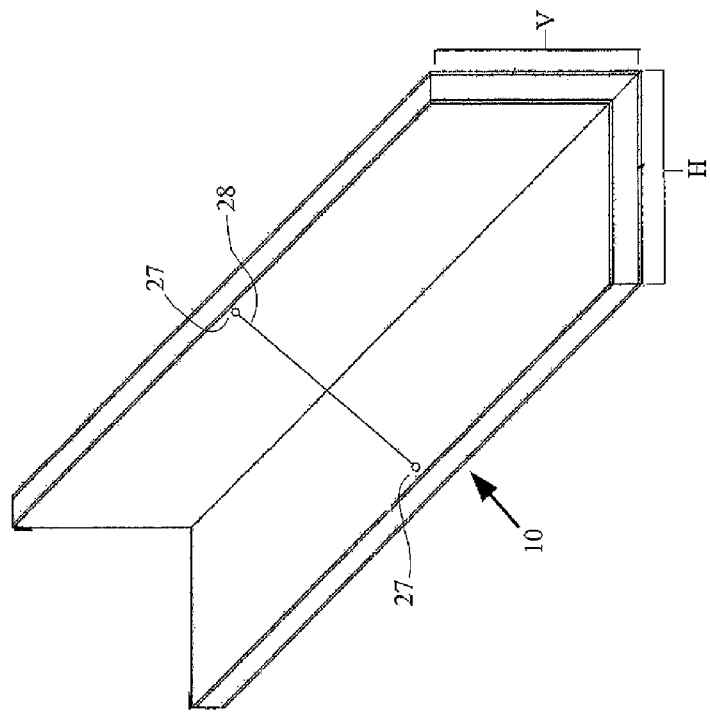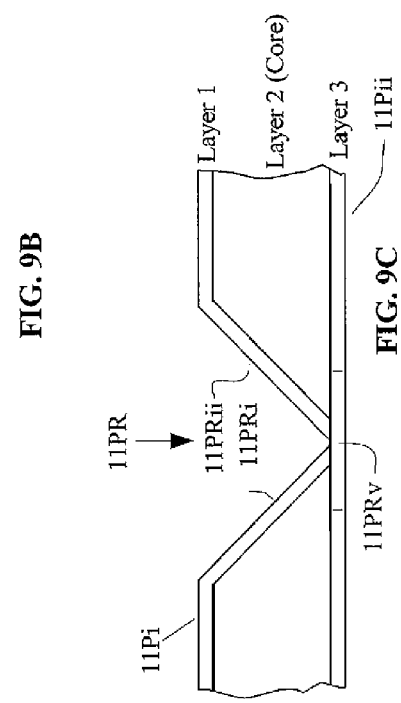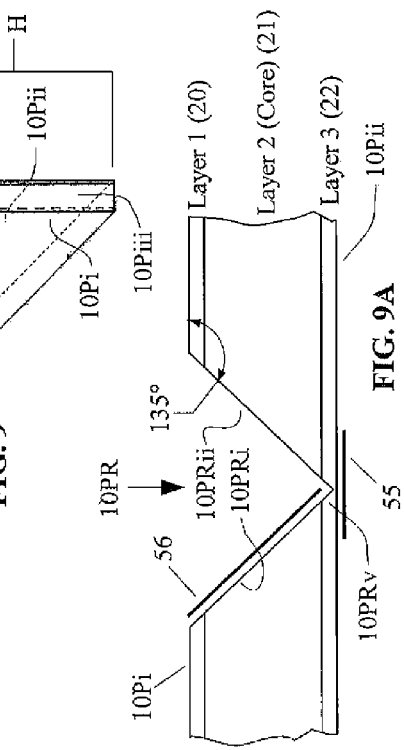

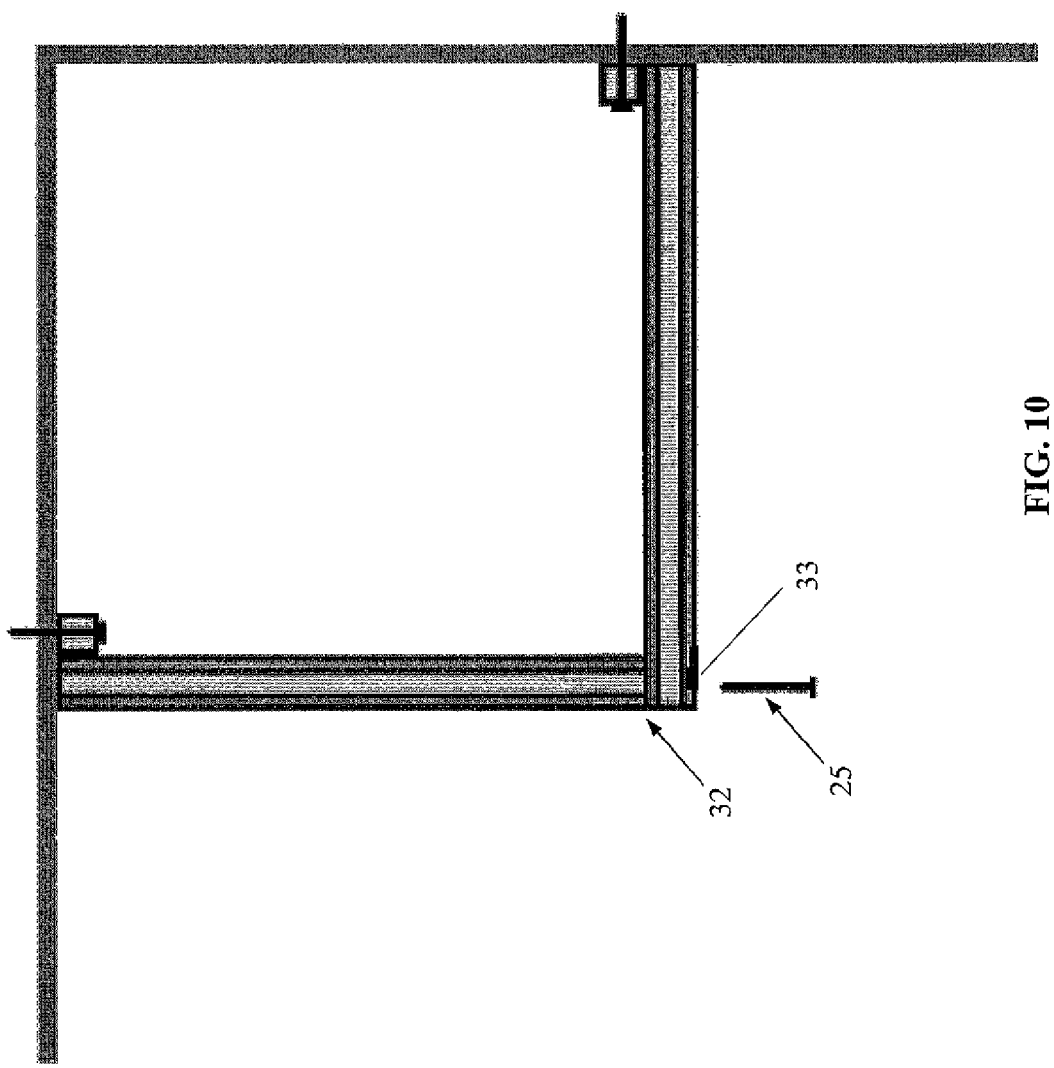

REMOVABLE BULKHEADS FOR BUILDING FIXTURES

CROSS REFERENCES TO RELATED APPLICATIONS

This application claims priority on U.S. Provisional Application Ser. No. 61/458,304 filed on Nov. 19, 2010, the disclosures of which are incorporated herein by reference.

BACKGROUND OF THE INVENTION

The present invention relates to a series of removable bulkheads which surround and protect immovable building fixtures such as sprinkler and plumbing lines, heating and ventilation ducts, and electrical and telecommunications wiring.

Building managers which administer residential and commercial leases often have to renovate rental properties to meet the needs of a tenant or renovate because of changes to municipal building codes. Rental properties can have a variety of utilities, such as piping, fire protection, electrical wiring, heating and ventilation ducts, and telecommunications wiring. Since in most properties, large portions of utilities like ventilation ducts, water piping, sprinklers, and electrical wiring are hidden behind finished ceilings and walls due to aesthetic concerns, building mangers need to hire carpenters to open up these ceilings and walls in order to access these utilities to perform renovations. Once a renovation is complete, a carpenter needs to be retained again to refinish these exposed ceilings and walls. In order to refinish the ceiling or wall, a carpenter will have to close the hole in the exposed ceiling or wall. A common technique used to refinished exposed ceilings and walls is drywalling.

Drywalling is a construction technique which involves the installation of gypsum plaster panels pressed between two thick sheets of paper or fiberglass, which are commonly known as drywall. Drywall is installed by first being cut to size by a carpenter to cover the exposed area, then attached to wall studs or ceiling joists using nails, glue, or screws. After the panels are secured to the studs or ceiling joists, the space between the panels of drywall and the existing wall must be covered with joint tape. Next, several layers of a mud like paste known as joint compound is then applied to the exposed surfaces of the panels. Finally, the exposed surface is sanded and then painted.

The drywalling technique has several inherent problems. First, drywall is very heavy making it difficult to handle and install. Drywall is also very brittle and prone to cracking and flaking when handled improperly. Application of joint compound to the exposed surface of the panels is a very messy process and compound will invariably get into unintended areas. For example, when drywall is installed near a sprinkler line, joint compound can infiltrate the sprinkler line and create clogs. New clogs in the sprinkler line require the retention of a sprinkler contractor for a second time, and a carpenter to open and reclose the ceiling.

The added expense of retaining two contractors to repeat the same work can significantly add to rental property's operating costs. The added time necessary for contractors to open a ceiling, re-fix a utility, and reclose a ceiling can add weeks, months, and sometimes years to the time it takes for a tenant to move into a rental property. This additional time can cause a significant loss of rental income for landlords. Commercial tenants would also lose income from their inability to utilize their rental space to carry on their business. Residential tenants would be forced to bear the additional cost of finding temporary housing.

Another problem associated with using drywall is that it generates a large amount of waste. Drywall is only sold in large sheets and in order to refinish a ceiling or patch a wall a carpenter will invariably need to cut much smaller pieces from the larger pieces. Once the smaller pieces are cut, the larger sheets almost always become useless because their shape has now become irregular, and are discarded as waste.

Another problem associated with using the dry wall technique is the time it takes to complete. The drywall needs to be cut, attached, taped, covered with joint compound, sanded, then painted. Each step relies on a different skill set to complete and is an opportunity to damage a nearby utility. Putting drywall to refinish the ceiling of an average sized room could take anywhere between 4 to 7 days.

Thus, the problem of a quick and cost effective method for carpenters to refinish the ceilings and walls that house the utilities of a property remains.

SUMMARY OF THE INVENTION

The present invention is directed towards a series of removable bulkheads which surround and protect immovable building fixtures such as sprinkler and plumbing lines, heating and ventilation ducts, electrical and telecommunications wiring. A single bulkhead is generally comprised of a vertical panel attached to a horizontal panel. The bulkheads attach to pre-existing ceilings and walls and provide a quick and cost effective method of concealing fixtures and allows easy access to renovate or repair the fixtures.

BRIEF DESCRIPTION OF THE DRAWINGS

FIG. 1 is a perspective view of a first embodiment of the bulkhead of the present invention, prior to bending.

FIG. 1A is a cross-sectional view through the recess of the bulkhead of FIG. 1.

FIG. 1B is a perspective view of the bulkhead of FIG. 1, after bending.

FIG. 4 is a perspective view of two bulkheads of a second embodiment, with a joining block inserted at one end.

FIG. 4A is a perspective view of the two bulkheads of FIG. 4t, but with the joining block inserted at the opposite end.

FIG. 9 is a perspective view of a second embodiment of the bulkhead of the present invention.

FIG. 9A is a cross-sectional view through the recess of the bulkhead of FIG. 9.

FIG. 9B is a perspective view of the bulkhead of FIG. 9, after bending.

FIG. 9C is a cross-sectional view through a third embodiment of the bulkhead of the present invention, which may comprise two rigid outer layers that may transition therebetween, using a flexible material.

FIG. 10 is a vertical cross-sectional view of the vertical and horizontal panels of the present invention meeting to form a butt joint.

DETAILED DESCRIPTION OF THE INVENTION

Figure 2:
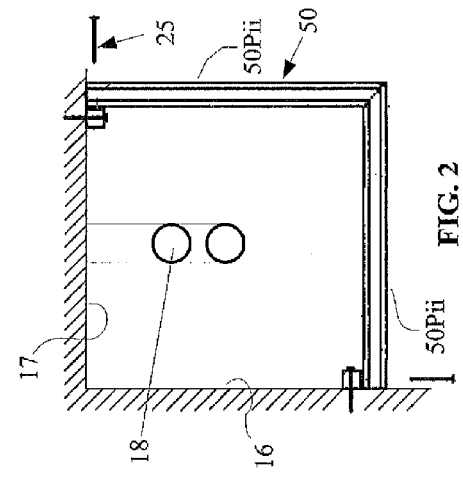
FIG. 2 is a cross-sectional view of the bulkhead of FIG. 1B installed using a first method of installing the bulkhead.

The present invention is directed towards a series of removable bulkheads which surround and protect immovable building fixtures such as sprinkler and plumbing lines, heating and ventilation ducts, electrical and telecommunications wiring. A bulkhead could just be an upright partition creating a compartment, according to the traditional definition. However, as utilized herein, the removable bulkhead may comprise a specially constructed panel and associated installation procedure, in which only a portion may be in the upright position. Each of the sections of the bulkhead may be formed of generally flat surfaces as shown in FIG. 1, or they may have curved portions or may be completely curved to accommodate any aesthetic or functional design requirement. Also, the bulkhead may be comprised of any rigid board material that can be painted, such as fiberglass, plywood, masonite, plastic, etc.

Two different approaches for manufacturing of the bulkhead may be taken. In a first embodiment, illustrated initially in FIGS. 1, 1A, and 1B, the finished bulkhead 50 may be manufactured using hardboard. Hardboard is a type of fiberboard, which comes in three different varieties. Listed in order of increasing density, those fiberboard varieties are particle board, medium-density fiberboard, which is utilized heavily in the furniture industry along with wood veneers, and hardboard. Hardboard is made from exploded wood fibers that have been highly compressed. In this first embodiment, a bulkhead may be formed from a length of a three-layered piece of hardboard. The length and width of the piece 50P of hardboard may be selected to produce a standard sized bulkhead panel 50, as discussed hereinafter.

The piece of hardboard 50P may be cut to be generally rectangular, having a top surface $50P_i$ and a bottom surface $50P_{ii}$ being generally parallel to each other; a first end surface $50P_{iii}$ and a second end surface $50P_{iv}$, being generally parallel to each other, and being generally orthogonal to the generally parallel top and bottom surfaces $50P_i$ and $50P_{ii}$; and a first side surface $50P_v$ and a second side surface $50P_{vi}$, with the first side surface $50P_v$ being generally orthogonal to the generally parallel top and bottom surfaces $50P_i$ and $50P_{ii}$, and also being generally orthogonal to the generally parallel first and second end surfaces $50P_{iii}$ and $50P_{iv}$.

As seen in FIGS. 1 and 1A, the piece of hardboard 50P may have a machined recess 50PR that may be formed using a CNC machine. The recess 50PR may run the entire length L of hardboard 50P, running along the top surface $50P_i$ and penetrating down and possibly even into to the third layer 53. The recess 50PR may generally form a V-shaped notch having a first side surface $50PR_i$ and second side surface $50PR_{ii}$, each of which may be at a 45 degree angle to the generally flat top surface $50P_i$. Therefore, the first side surface $50PR_i$ and second side surface $50PR_{ii}$ may be orthogonal to each other. At the base of the recess (near second side $50PR_{ii}$) may be a relief-groove that may be radiused.

To convert the machined hardboard panel 50P of FIG. 1 into the L-shaped bulkhead panel 50 of FIG. 1B, the portion H must be bent approximately 90 degrees about the recess, as shown by the curved arrow in FIG. 1, so that the portion H is then horizontal. To better accommodate bending of the hardboard panel SOP and inhibit tearing or splintering at the recess 50PR, a piece of tape 55 may be attached to bottom surface $50P_{ii}$, so as to run down the length L of the surface between first end surface $50P_{iii}$ and second end surface $50P_{iv}$. In addition, to help in securing the folded hardboard panel and prevent any spring-back after the folding process is completed, a piece of double-sided tape 56 may be secured to either first side surface $50PR_i$, or to second side surface $50PR_{ii}$ of recess 50PR, so as to run down the length L of the surface between first end surface $50P_{iii}$ and second end surface $50P_{iv}$. The tap may be an acrylic tape. After performing the bending operation, which may also utilize an application of water or other softening agent to make the hardboard temporarily more pliable, and with the tape securing the vertical and horizontal bulkhead portions together, whereby first side surface $50PR_i$ of recess 50PR is now generally parallel and proximate to second side surface $50PR_{ii}$, mechanical fasteners such as screws, may, but need not necessarily be, driven into the bend of the joint to more positively secure the joint. (Note—this approach to manufacturing the L-shaped bulkhead 50 may also be used to construct a U-shaped bulkhead that would begin with a hardboard panel having two recesses, and which may be secured to the ceiling).

The bulkhead 50 can be secured to an existing wall and ceiling, along which may run utility or other fixtures 18, such as: water piping, electrical wiring, heating or ventilation ducts, and telecom wiring runs along. A first installation method of the bulkhead panel 50 may be seen in FIG. 2. In the first installation method, two nailing strips 24 may be installed upon a building wall 16 and two nailing strips 24 may be installed upon a ceiling 17, with the strips being parallel to each other, and being separated according to the final dimensions of the bulkhead 50. The nailing strips 24 may be rectangular and be comprised of any material that is capable of receiving mechanical fasteners like nails or screws, and which is also capable of supporting the weight of the bulkhead. The nailing strips 24 can be secured to the wall and ceiling using any suitable mechanical fastening arrangement. The strip 24 may simply be nailed in place using, for example, fifteen gauge headless nails 25, or strip 24 may be secured using wood screws, or screws with plastic anchors, or molly bolts, etc, depending upon the make-up of the wall/ceiling structure. The nailing strips 24 can be manufactured with predrilled pilot holes for receiving the fasteners used in securing of the strips to the wall and ceiling, to permit a faster and or easier installation. In a preferred embodiment, two pairs of strips 24 are used for every 8 feet of length of the bulkhead 50.

In certain states, an asbestos abatement issue may arise as a result of penetrating into or otherwise disturbing a ceiling or wall of an older structure that contains asbestos in amounts that exceed so-called "trigger levels." Where these levels are found, a certified removal contractor (General Abatement Contractor) must remove asbestos-containing materials prior to the renovation. (see e.g., http://www.cdphe.state.co.us/ap/asbestos/renodemo.pdf). Therefore, the nailing strips 24 may also be installed upon the wall and ceiling through the use of adhesives, to avoid the need for triggering additional work. The use of adhesive may also be desirable for the nailing strip installation upon "popcorn" style acoustic ceilings, which also routinely contained asbestos in the past.

Figure 2A:
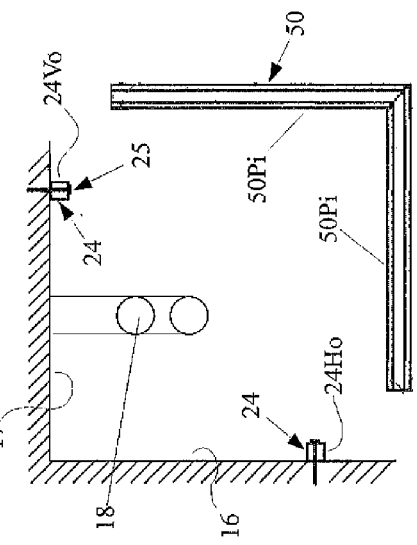
FIG. 2A is a cross-sectional view of the bulkhead of FIG. 1B as it is being advanced toward the nailing strips in the first method of installing the bulkhead.
Figure 2B:
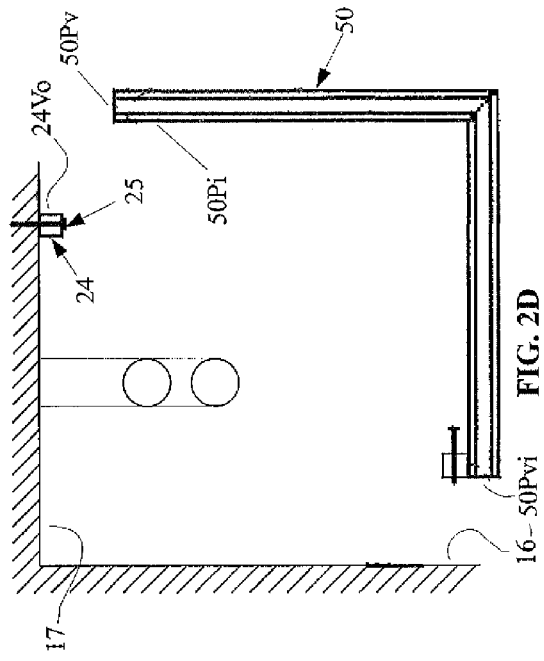
FIG. 2B is a cross-sectional view of the bulkhead of FIG. 2A, as it is being advanced first toward the wall and then toward the ceiling, in the second method of installing the bulkhead, with a first nailing strip attached to the vertical portion of the bulkhead using quick release fasteners.

Following installation of the nailing strips 24, as seen in FIG. 2A, the bulkhead 50 may be advanced toward the nailing strips so that the vertical portion of inner surface 50P$_i$ of the bulkhead 50 is aligned with the nailing strip 24 vertical outer contact surface 24Vo of the strip secured to the ceiling 17, and with the horizontal portion of inner surface 50P$_i$ of the bulkhead 50 being aligned with the nailing strip 24 horizontal outer contact surface 24Ho of the strip secured to the wall 16 (FIG. 2) Next, nails or screws 25 may be driven into the vertical and horizontal portions of outer surface 50Pii of the bulkhead to secure the bulkhead to the nailing strips 24. Rather than securing the bulkhead 50 to nailing strips 24 using mechanical fasteners, adhesive may instead be used. After securing the bulkhead 50 to the nailing strips 24, any gaps at the interface between the bulkhead 50 and ceiling 17, as well as between the bulkhead 50 and wall 16 may be taped and/or caulked to conceal the appearance of the seams.

When access to the utilities or fixtures 18 is necessary, all that is required is the removal of the nails or screws 25 that were used to secure the bulkheads to the nailing strips 24. Once the nails or screws 25 are removed, the utilities or fixtures 18 will be freely accessible for renovations. Once renovations are complete, the bulkheads can be reattached to the existing walls 16 and/or ceilings 17 using the nailing strips.

The length L of the bulkhead 50 may be constructed in 8 foot increments, or other incremental lengths to meet various design and aesthetic construction requirements. In a preferred embodiment, the length of the bulkhead is 8 feet. The lengths of the vertical and horizontal portions or legs of the L-shaped bulkhead 50 can also be varied to meet various design and aesthetic requirements, and may be manufactured in several standard sizes, such as: 6" by 6", 8" by 8", 8" by 10", 12" by 12", and 18" by 18", etc. The thickness of the hardboard panel used to create the bulkhead may also be varied accordingly for the size of the leg, and particular strength requirements or other considerations.

The legs (vertical and horizontal portions) of the standard bulkhead 50 may also have cutouts therein so as to be contoured about any geometric irregularities in the walls and/or ceiling in the region in which the bulkhead is to be installed. Also, the vertical and horizontal portions of the bulkhead may be manufactured with any number of orifices to accommodate transverse passage of any object, such as wiring, etc. Moreover, in an alternate embodiment, the ends of the horizontal and/or vertical portions of the bulkhead 50 may be grooved, which may serve two functions.

Figure 5:
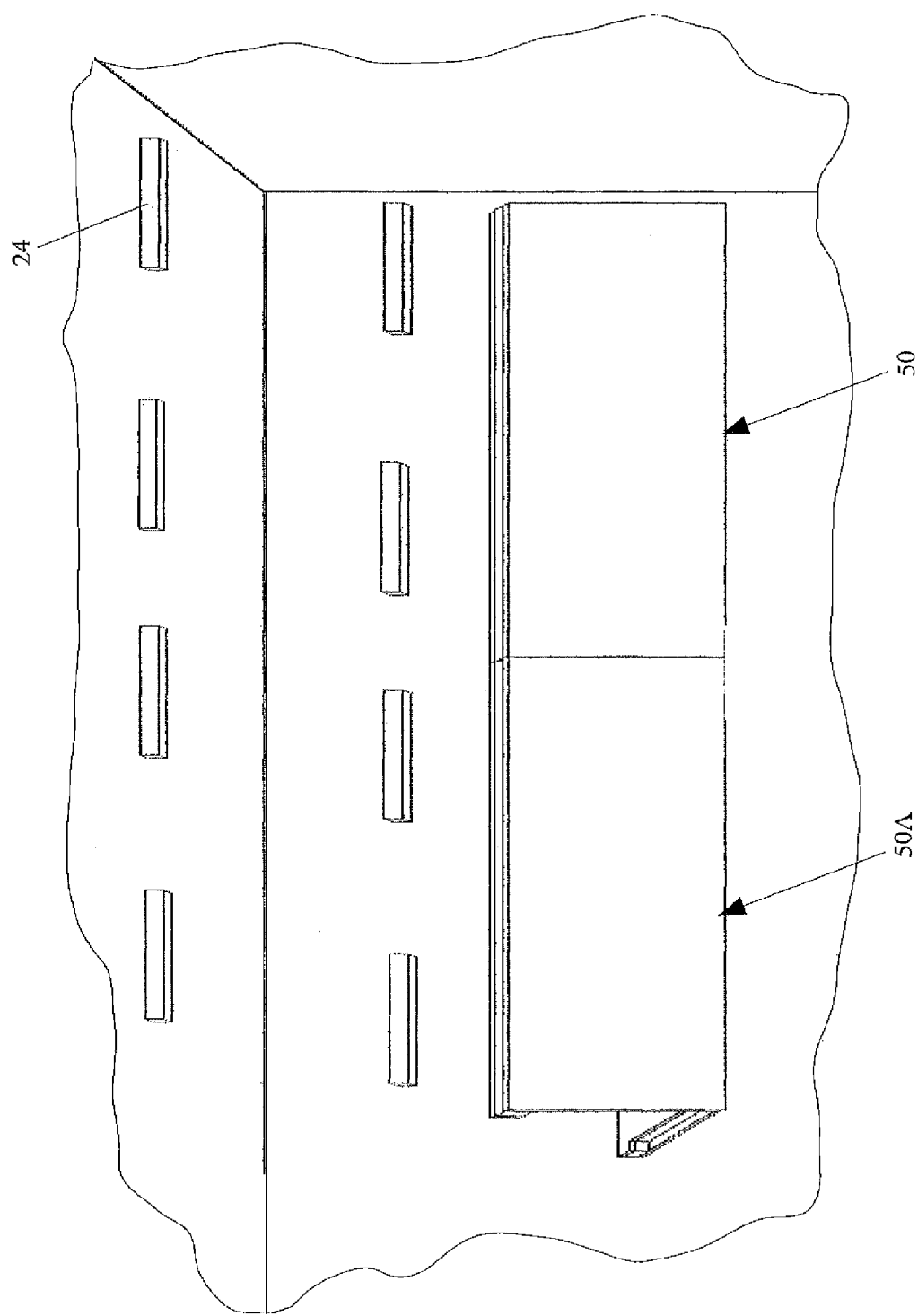
FIG. 5 is a perspective view of two bulkheads of FIG. 4 having been joined together, and with nailing strips of the present invention secured to the wall and ceiling.

First, such a groove may be utilized so that two or more bulkheads 10 can be joined to each another. In one embodiment, as seen for the first end 51 of the bulkhead shown in FIG. 4A, a groove 53 is cut in either of, or both of, the first and second ends, 51 and 52, of the bulkhead 50. The groove 53 allows for the insertion of a joining wood block 30, which is also shown therein, being displaced from the bulkhead. The size and shape of joining wood block 30, must correspond to the size and shape of the groove 53 in the bulkhead 10, and may preferably be engaged therein in a slight clearance fit or a slight interference fit, depending upon how it is ultimately secured within the groove 53. The joining wood block 30 may be secured inside the groove 53 by any conventional means, such as adhesive, nails, screws, staples, etc. Where adhesive is used, a slight clearance fit may preferably be used in order to account for the thickness of a layer of the adhesive. Once a first end 31 of the joining wood block 30 is secured within a groove 53 of a first end 51 of bulkhead 50, the second end 32 of joining wood block 30 may next be secured to another groove 53A of a second end 52 of another bulkhead 50A, as shown in FIG. 4, to create the joined bulkheads seen in FIG. 5. A series of bulkheads 50, 50A, 50B, etc., may be assembled together in this manner to accommodate any length of room and fixtures.

Figure 6:
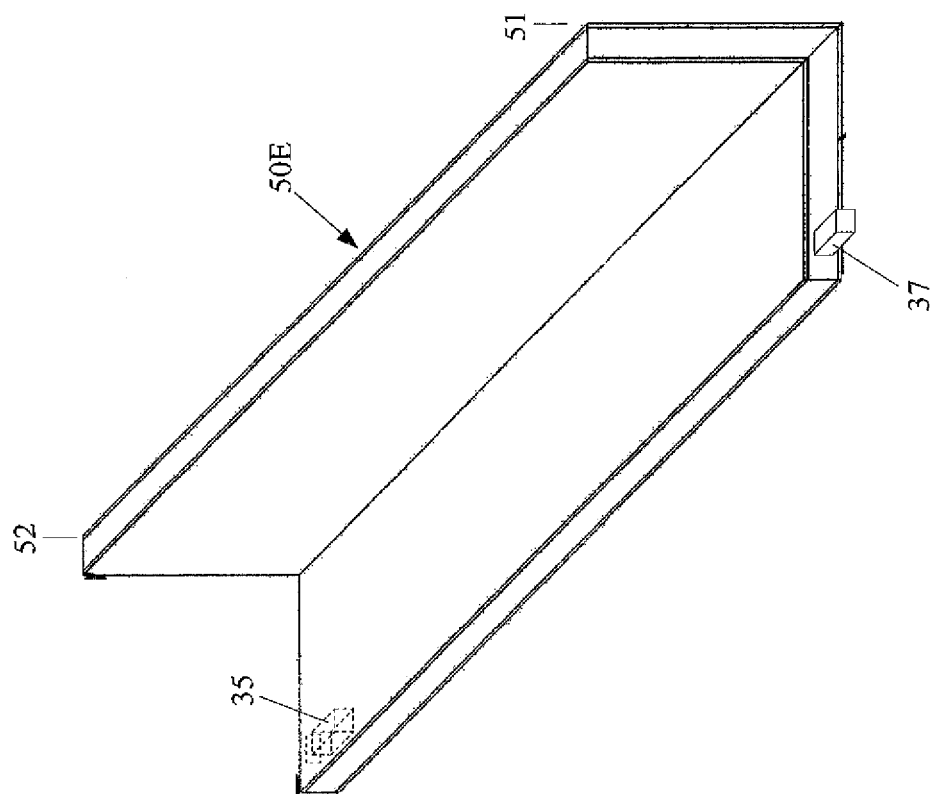
FIG. 6 is another perspective view of a bulkhead of the present invention with the rear end having a mortise and the front end having a tenon.

A different means of joining the bulkheads is shown by the alternative bulkhead embodiment of FIG. 6, where the second end 52 of each bulkhead 50 may have at least one mortise 35, and the first end 51 may have a tenon 37 of corresponding shape and size. In this embodiment, in order to attach one bulkhead 10 to another, the mortise 35 on the second end 52 of one bulkhead receives the tenon 37 on the first end 51 of another by bulkhead. The resulting mortise and tenon joint can be reinforced by using glue or caulk.

Figure 7:
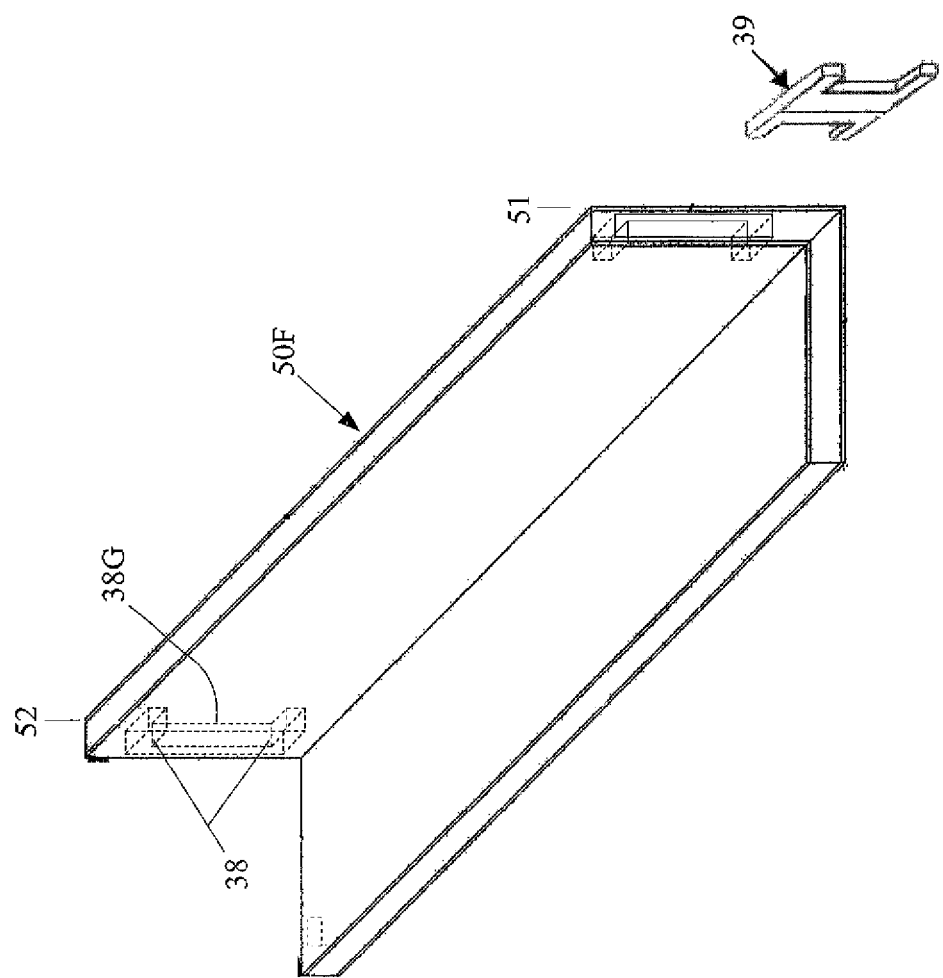
FIG. 7 is a perspective view of a bulkhead of the present invention with double mortise opening at each end, and with a "u" shaped joining member shown prior to insertion into one pair of the mortises.

In another embodiment, shown in FIG. 7, the second end 52 and first end 51 of each bulkhead 50F may have at least two mortises 38 and a groove 38G with a size and shape capable of receiving one-half of the "H" shaped joining member 39. One-half of the "H" shaped member 39 may be received in and secured to the mortises 38 and groove 38G of one end of the bulkhead 50F, while the other one-half of the "H" shaped member 39 may be received in and secured to the mortises and groove of another bulkhead. The one-half portion of the "H" shaped joining member 39 may be secured inside each of the two mortises 38 and groove 38G of each bulkhead 50F by any conventional means, such as: adhesive, nails, staples, etc.

Figure 8:
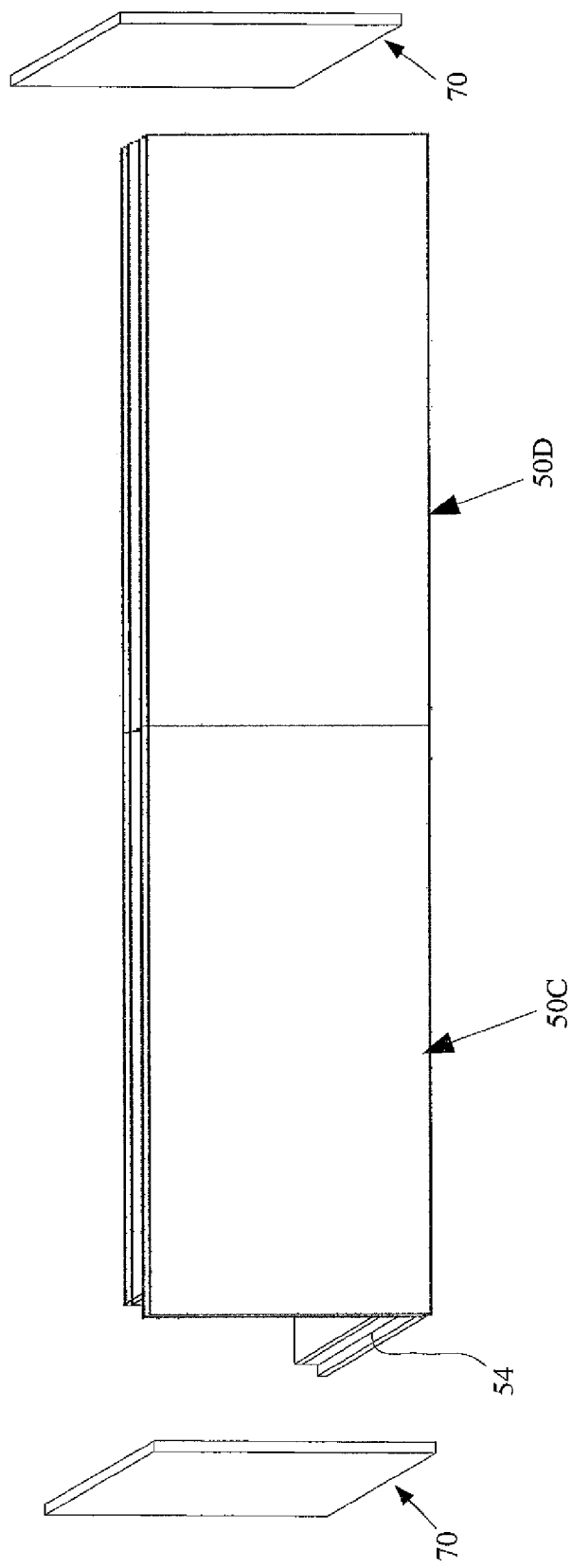
FIG. 8 is a perspective view of two joined bulkheads, with first and second end cap panels displaced therefrom, and being shown just prior to installation into the ends of the bulkhead.

Another use of the aforementioned groove at the ends of the bulkhead 50 may comprise utilized after the installation of the finished bulkhead 50 against the buildings wall and ceiling, where it does not span between two walls (or utilization even prior to its installation—see FIG. 8), such that an end cap panel 70 is secured in a groove 54 at opposite ends of a bulkhead or a series of bulkheads, so as to be able to completely enclose fixtures therein. The end cap panel 70 may be a single panel constructed of the same material used to form the bulkhead. The dimensions of the end cap panel 70 will generally correspond to the cross section of the bulkhead 50C/50D at the grooved ends, such that once the front and rear caps are installed, the interior of the bulkhead may be completely obscured. The end cap panel 70 can be secured within the groove 54 of the respective ends of the bulkheads 50C and 50D by any conventional means, such as: nails, screws, adhesive, staples, etc.

Figure 3:
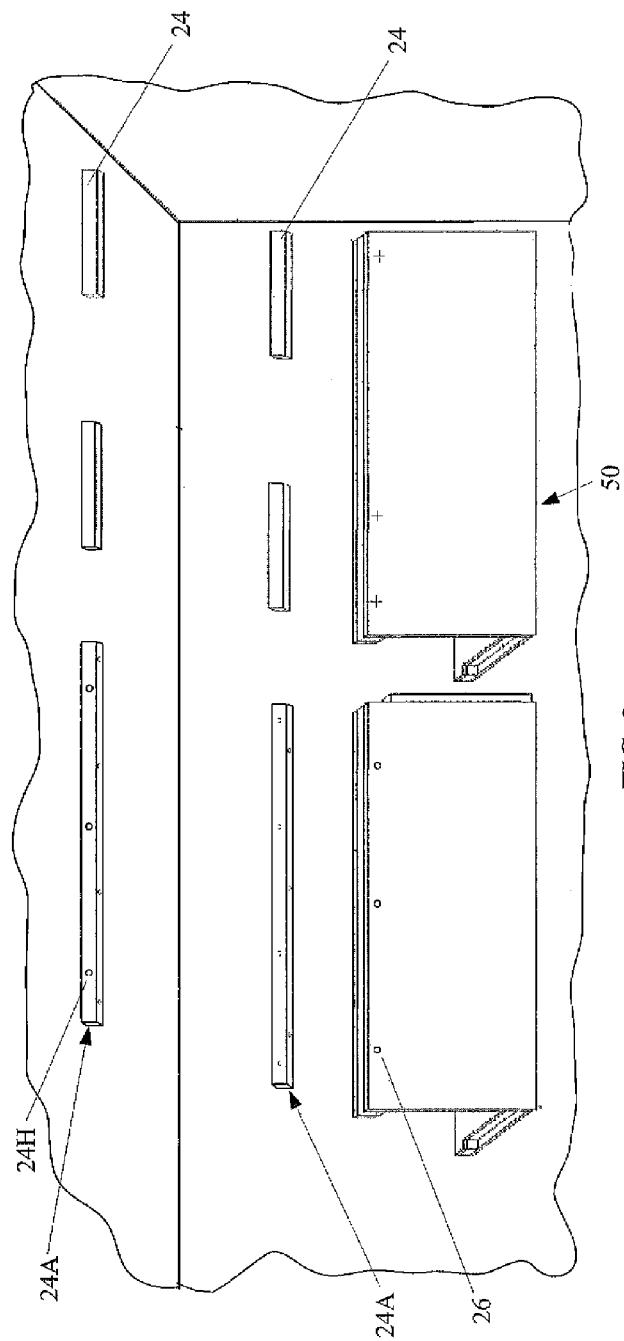
FIG. 3 is a perspective view of two bulkheads as embodied in FIG. 1 just prior to installation using nailing strips of the present invention that are secured to a wall and ceiling.

To accommodate easier initial installation, and subsequent removal and re-installation of the bulkhead, a single longer nailing strip 24A may be used, as shown in FIG. 3. In addition, rather than using nails or screws for securing the bulkhead thereto, quick release fasteners 26 may be used, such as a variety of the Camloc available from Alcoa Fastening Systems, which is located at 8001 Imperial Drive, Waco, Tex. (see www.afscamloc.net/prod1.php?lang=en&ID=6 and http://pdf.directindustry.com/pdf/camloc/camlock-quick-release-fasteners/56993-66819.html with the disclosures of each being incorporated herein by reference). As seen in FIG. 3, three quick release fasteners 26 may be pre-installed in the bulkhead on the vertical portion and three may also be installed in the horizontal portion, where those fasteners may be received through pre-drilled holes and pre-installed corresponding receptacles within the longer nailing strip 24A. The quick-release Camloc may only require one-quarter of a turn to thereby be engaged with, or disengaged from, the corresponding receptacle within the nailing strip. This arrangement leads to a vastly simplified method of initially installing the nailing strips and bulkhead without measurements, which is seen within FIGS. 2B-2E.

Figure 2C:
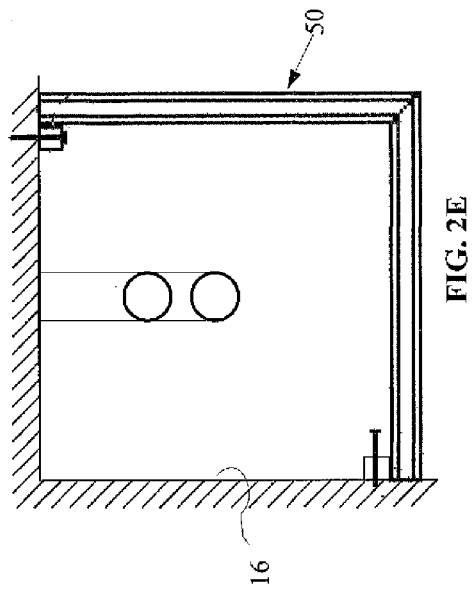
FIG. 2C is the cross-sectional view of FIG. 2B, with the nail of the nailing strip attached to the vertical portion of the bulkhead being depressed into the ceiling to form pilot holes therein.
Figure 2D:
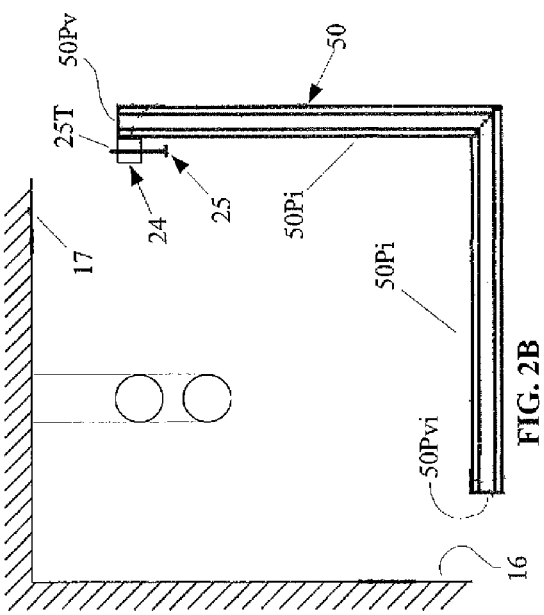
FIG. 2D is a cross-sectional view of the bulkhead of FIG. 2C, as it is being advanced first toward the ceiling and then toward the wall, in the second method of installing the bulkhead, with the first nailing strip having been secured to the ceiling using nails, and with a second nailing strip attached to the horizontal portion of the bulkhead using quick release fasteners.

As seen in FIG. 2A, the bulkhead 50 may have a first nailing strip 24A attached to the vertical portion of the bulkhead using quick release fasteners, and with the nailing strip having a nail 25 having been pre-hammered therein so as to only protrude a small amount from the nailing strip. The bulkhead is then advanced first toward the wall 16 so that surface $50P_{vi}$ contacts the wall, and the bulkhead is then advanced toward the ceiling, so that the first nailing strip 24A contacts the ceiling 17, causing the protruding nails to create small pilot holes therein (FIG. 2C). To make the pilot holes more immediately visible in the ceiling, a small amount of paint may be blotted onto the tip of the nail 15 prior to advancing the bulkhead as just described. Next, as seen in FIG. 2D, the bulkhead is then backed away from the ceiling and wall, the first nailing strip 24A is detached from the bulkhead using the one-quarter-turn quick release fasteners, and is nailed in place on the ceiling 17 using the pilot holes therein. A second nailing strip 24A is also then attached to the horizontal portion of the bulkhead. Next, as seen in FIG. 2C, the bulkhead is now first being advanced toward the ceiling until the surface 50Pv (see FIG. 2D) contacts the ceiling 17, and is then advanced toward the wall 16, so that the nails of the second nailing strip attached to the horizontal portion of the bulkhead are depressed into the wall to form pilot holes therein. The bulkhead 50 can once again be backed away, the second nailing strip 24A may be removed detached from the bulkhead using the one-quarter-turn quick release fasteners, and is nailed in place on the wall 16 using the pilot holes just formed therein. The bulkhead can now being removably secured to the nailing strips using the quarter-turn quick release fasteners, with the nailing strips being ideally positioned on the ceiling and wall to support the bulkhead.

In an alternative embodiment for the manufacturing of the bulkhead, a single removable bulkhead 10 (FIGS. 9, 9A, and 9B) may comprise a panel having an inner layer 20 and outer layer 22, and a core 21. The inner layer 20 and outer layer 22 of the bulkhead 10 may be comprised of a rigid board material that can be painted, such as fiberglass, plywood, masonite, plastic, and particle board. The outer layer 22, as seen in FIG. 9A, may be machined to have the V-shaped recess therein to complete the recess 10PR of the panel. The machined process in outer layer 22 may result in a remaining local thickness of the layer at the V-shaped recess being as small as 0.001 inches. A machining process that actually pierces the layer 22 to form two separate parts is not detrimental, and comprises an alternative method of assembling the bulkhead. However, retaining the small thickness (0.001 or slightly greater) at the V-shaped recess to have a single hardboard part forming layer 22 may be advantageous to simplify the bulkhead assembly process (taping and bending).

Figure 2E:
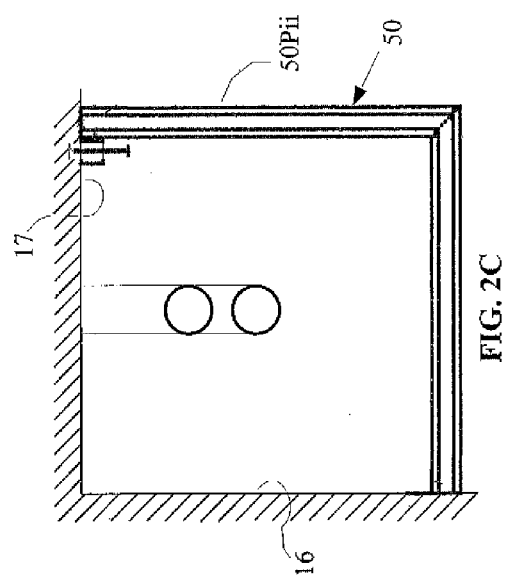
FIG. 2E is the cross-sectional view of FIG. 2D, with the nail of the second nailing strip attached to the horizontal portion of the bulkhead being depressed into the wall to form pilot holes therein.

The core 21, which may be a honeycomb type of core, may generally be comprised of polystyrene with an ASTM E84 Flame Spread rating of 5-10 and 60-200 smoke development, which is 35% less than conventional dry wall. In a preferred embodiment, the thickness of each of the vertical and horizontal portions of bulkhead 10 may be ¾ of an inch, which may preferably be formed using an inner layer 20 and outer layer 22 of hardboard being 0.08 inches in thickness, and a core being 0.59 inches thick. However, the panel thickness may be constructed to have a finished thickness of 3 inches, or even greater. The three layers may be bonded together like a "glulam" (glued laminated timber product). In a preferred embodiment, an 8 foot length of bulkhead 10 with a 6" by 6" cross section will weigh less than 10 pounds. In another embodiment, a sheet of Formica may be applied to the outer surface of the bulkhead 10 using adhesive, or any other conventional method.

Where the outer layer is a hardboard type of material, the bulkhead may be formed as previously described, i.e., bending to obtain the L-shape. However, in an alternative arrangement, the bulkhead may be manufactured to be a composite honeycomb core sandwich panel. The bulkhead 11 shown in FIG. 9C may comprise at least two rigid outer layers sections that may transition therebetween, in the region near the bottom valley 10PRv of the V-shaped recess 10PR, using a flexible material, such as by integrating into the third layer, one or more layers of a rubber-like material, which obviates the need for the tape and the bending procedure. The L-shaped bulkhead 11 may then be formed, when desired, by simply folding the two panel sections. To accommodate and simplify the panel's installation, the L-shape of the panel may be maintained by securing eyelet screws 27 to each of the two panels, as seen in FIG. 9B, and then by limiting the movements of the two panels by connecting a member, such as a wire or bungee cord, between the two eyelets. This arrangement may also undergo the installation procedures of FIGS. 2B-2E. Moreover, where a quickly removable bungee cord with hooked ends is used to limit travel of the panels sections and where the eyelet screws are positioned near one of the ends of the panel, instead of the center, removal of the bulkhead after locating the nailing strip 24 in FIG. 2E is obviated. Instead, the vertical portion may be secured to the nailing strip previously installed on the ceiling using the Camlocs, and the bungee temporarily unhooked to permit rotation of the horizontal panel portion and removal of the nailing strips therefrom, so that they may be secured to the wall 16 using the newly formed, paint-marked, pilot holes. The horizontal panel portion may then be re-attached to the nailing strip 24 now installed on wall 16, using the Camlocs. In addition, future access to the to the fixtures would not even require complete removal of the bulkhead, and instead, only the horizontal panel portion secured to the nailing strips 24 on the wall 16 need be disconnected.

Figure 11:
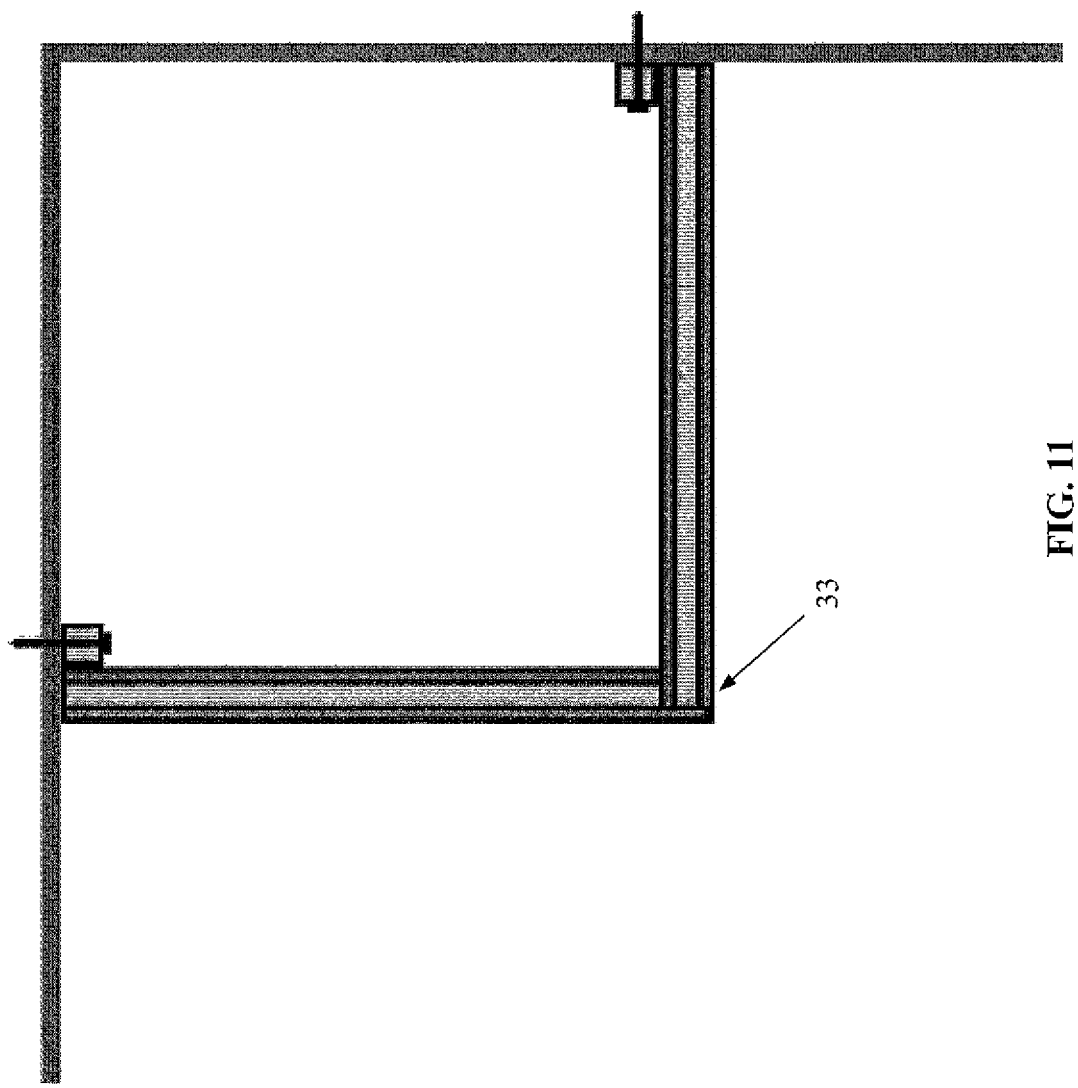
FIG. 11 is a vertical cross-sectional view of the vertical and horizontal panels of the present invention meeting to form an end lap joint.
Figure 12:
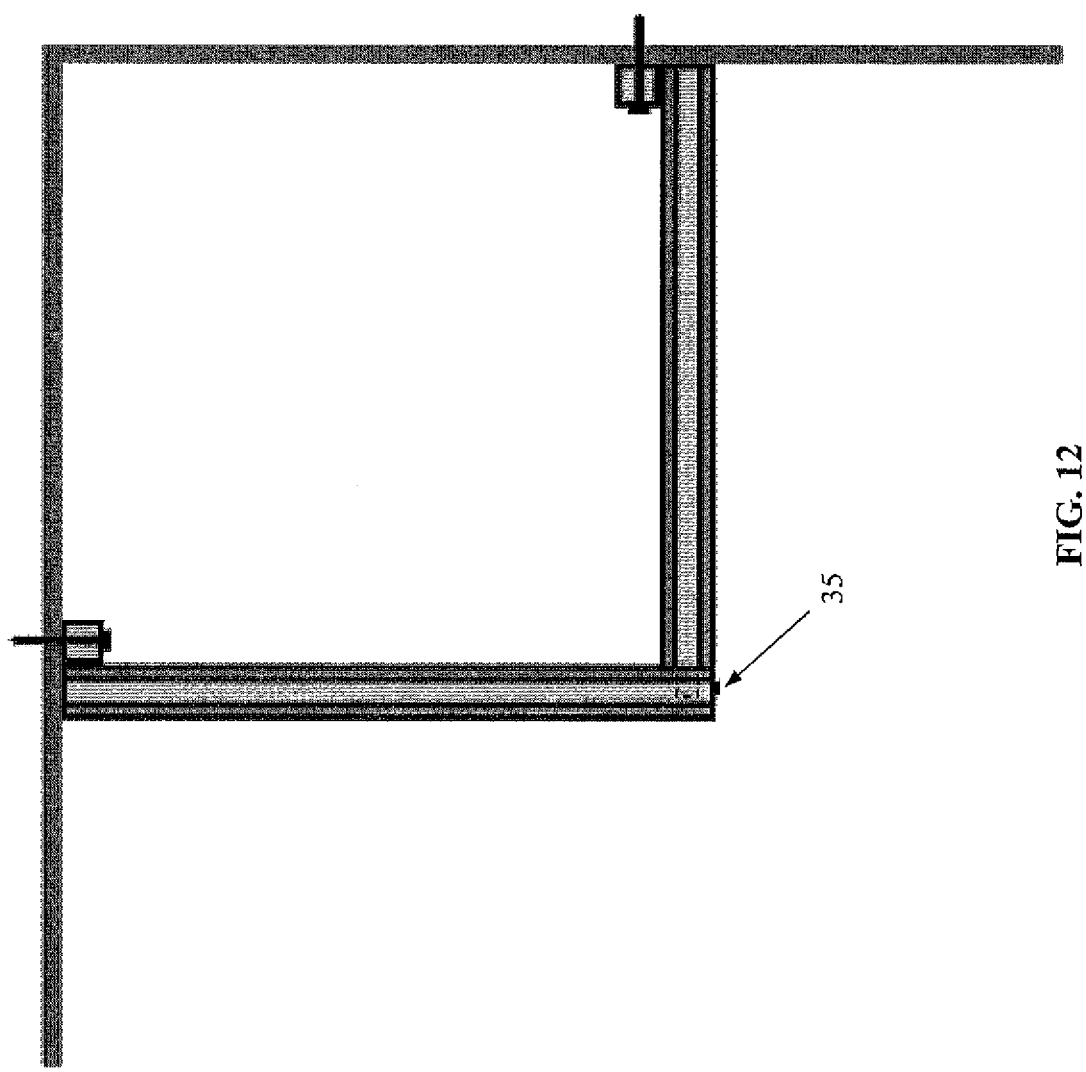
FIG. 12 is a vertical cross-sectional view of the vertical and horizontal panels of the present invention meeting to form a mortise joint.

In another alternative embodiment for manufacturing the bulkhead, as shown in FIG. 10, a separated vertical panel portion can attach to a separate horizontal panel portion to form a butt joint 32. This butt joint may be reinforced by drilling at least one hole through a bottom surface 33 of the horizontal panel 3, and into the vertical panel, and inserting a screw 25, nail, dowel, or cylindrical disk. In another embodiment, the vertical panel portion can attach to the horizontal panel portion to form an end lap joint 34, as shown in FIG. 11. In another embodiment, the vertical panel portion can attach to the horizontal panel portion to form mortise joint 35, as shown in FIG. 12. The vertical panel can be secured to the horizontal panel, regardless of the joint used, by any number of conventional methods, such as: glue, caulk, screws, or nails.

Figure 13:
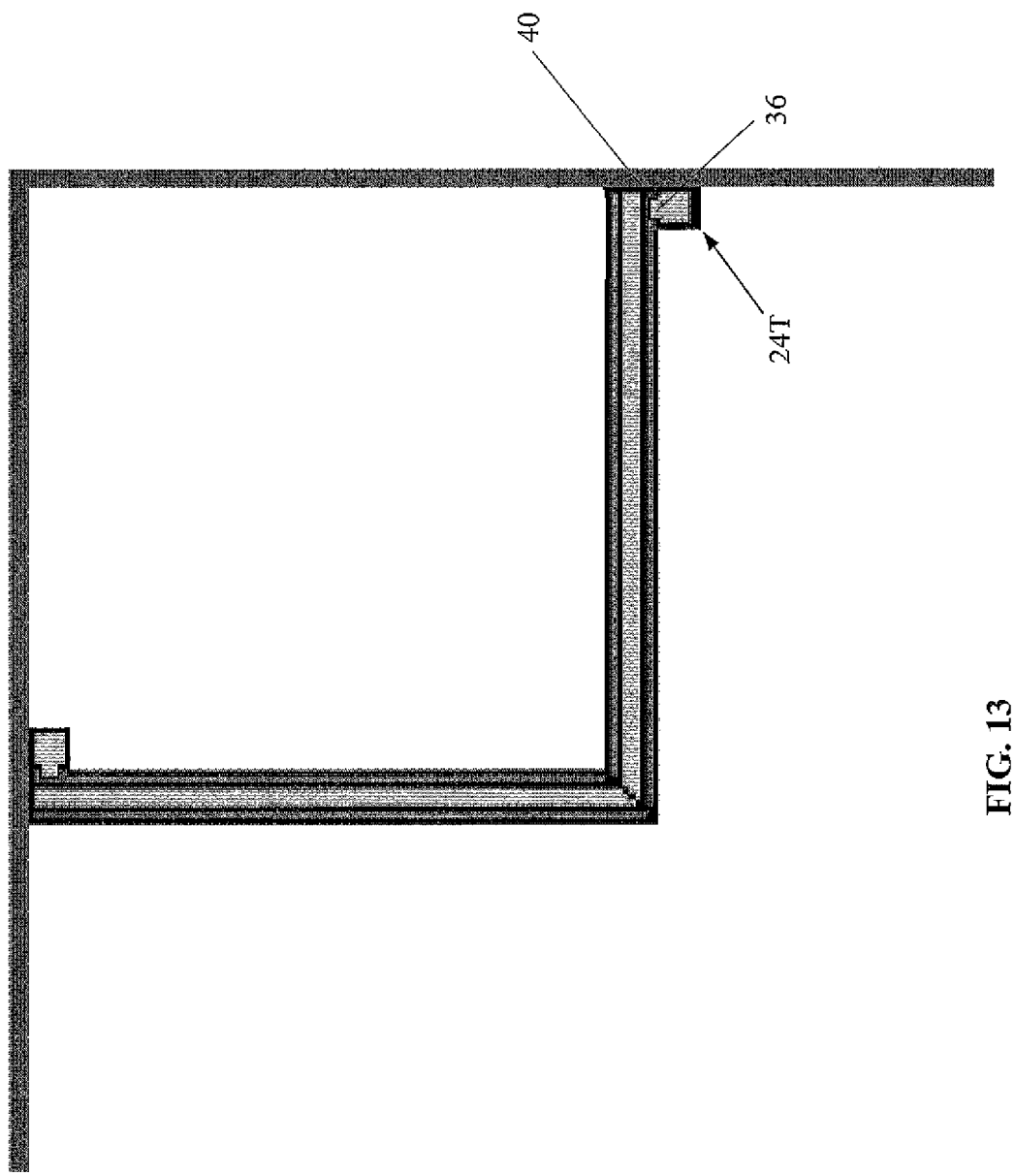
FIG. 13 is a cross-sectional view of the bulkheads of the present invention, where the bulkhead is secure with tenons on the bulkhead being received in mortises in the nailing strips.

In yet another alternative embodiment, a special nailing strip 24T can be manufactured to have a tenon 36 extending from an outside of the nailing surface, as shown in FIG. 13. The size and shape of the tenon 36 will be such that it can be received in a corresponding recess 40 on the bulkhead. In this embodiment, in order to attach the bulkheads 23 to the nailing strips 24, the tenon 36 of the nailing strips just needs to be inserted into the recesses in the bulkheads in a snap fit.

I claim:

1. A customizable modular panel assembly, for use in providing a removable and aesthetic enclosure for a building's sprinkler and/or plumbing lines, for heating and/or ventilation ducts, for electrical and/or telecommunications wiring, and/or the like, said customizable modular panel assembly comprising:
   a three-layer panel assembly, said three-layer panel assembly comprising:
      a rigid outer layer comprising a fiberboard; said fiberboard comprising a V-shaped notch, said V-shaped notch comprising a 90 degree angle;
      a first core; said first core comprising a polystyrene honeycomb core, said honeycomb core comprising substantially parallel top and bottom surfaces, and one side surface being at approximately a 45 degree angle to said substantially parallel top and bottom surfaces;
      a second core; said second core comprising a polystyrene honeycomb core, said honeycomb core comprising substantially parallel top and bottom surfaces, and one side surface being at approximately a 45 degree angle to said substantially parallel top and bottom surfaces; and
      a rigid inner layer comprising a first fiberboard member and a second fiberboard member;
   wherein said first core and said second core are positioned upon, and glue laminated with respect to, said fiberboard of said outer layer, such that said 45 degree angled face of said first core is proximate to said 45 degree angled face of said second core, and with each of said angled faces of said first and second cores being coplanar with a respective side of said V-shaped notch of said fiberboard of said rigid outer layer;
   wherein said first fiberboard member of said inner layer is positioned upon and glue laminated with respect to said first core, and said second fiberboard member of said inner layer is positioned upon and glue laminated with respect to said second core; and
   wherein said customizable modular panel assembly comprises:
      a piece of dual-sided adhesive tape attached to said 45 degree side of said first core of said three-layer panel assembly,
      a piece of single-sided adhesive tape removably attached to said fiberboard of said rigid outer layer to be opposite said V-shaped notch,
      said laminated fiberboard of said first layer, first core, and first fiberboard member of said inner layer being bent at said V-shaped notch, with respect to said laminated fiberboard of said second layer, second core, and second fiberboard member of said inner layer, with said dual-sided tape configured to secure said 45 degree side of said first core to said 45 degree side of said second core to form an L-shape for said panel assembly; and said removably attached piece of single-sided tape configured to inhibit tearing or splintering; and
   a plurality of means for mechanically fastening said 45 degree side of said first core to said 45 degree side of said second core.

2. The panel assembly according to claim 1 wherein said V-shaped notch comprises a radiused relief groove.

3. The panel assembly according to claim 2 further comprising a softening agent applied to said fiberboard of said rigid outer layer, said softening agent configured to temporarily make said fiberboard pliable.

4. The panel assembly according to claim 3 wherein said fiberboard comprises a fiberboard type from the group of fiberboard types consisting of: particle board, medium-density fiberboard, hardboard, and masonite.

5. The panel assembly according to claim 4 wherein said first and second polystyrene honeycomb cores each comprise polystyrene with an ASTM E84 Flame Spread rating of 5-10 and smoke development of 60-200.

6. The panel assembly according to claim 5 wherein said L-shape comprises legs consisting of standard sizes from the group of standard sizes consisting of: 6×6, 8×8, 10×10, 12×12, and 18×18.

7. The panel assembly according to claim 6 wherein said panel comprises a thickness of approximately ¾ of an inch; and wherein a 8 foot length L-shaped panel with said cross section of 6" by 6" weighs less than 10 pounds.

8. The panel assembly according to claim 1 wherein one or more mortises in a first said customizable modular panel assembly receive one or more corresponding tenons fixedly secured within, and protruding from, a second said customizable panel assembly, to join said first and second panel assemblies together.

9. The panel assembly according to claim 7 comprising: screws, or nails to secure said 90 degree L-shape; and wherein an H-member joins a first and a second one of said panels together by being received in corresponding mortises and grooves.

10. The panel assembly according to claim 7 further comprising two or more nailing strips configured to be fixedly secured to a wall and a ceiling of a building; and wherein said joined customizable panel assemblies are configured to be installed against the wall and the ceiling of the building by being releasably secured to said two or more nailing strips.

11. The panel assembly according to claim 10 wherein said joined customizable panel assemblies are releasably secured to said two or more nailing strips using one-quarter-turn quick release fasteners.

12. A customizable modular panel assembly comprising:
   a three-layer panel assembly, said three-layer panel assembly comprising:
      an outer layer comprising a fiberboard; said fiberboard comprising a V-shaped notch, said V-shaped notch comprising a 90 degree angle;
      a first core; said first core comprising a polystyrene honeycomb core, said honeycomb core comprising substantially parallel top and bottom surfaces, and one side surface being at approximately a 45 degree angle to said substantially parallel top and bottom surfaces;

a second core; said second core comprising a polystyrene honeycomb core, said honeycomb core comprising substantially parallel top and bottom surfaces, and one side surface being at approximately a 45 degree angle to said substantially parallel top and bottom surfaces; and an inner layer comprising a first fiberboard member and a second fiberboard member;

a piece of dual-sided adhesive tape attached to said 45 degree side of said first core of said three-layer panel assembly;

wherein said first core and said second core are positioned upon, and glue laminated with respect to, said fiberboard of said outer layer, with each of said angled faces of said first and second cores being coplanar with a respective side of said V-shaped notch of said fiberboard of said outer layer;

wherein said first fiberboard member of said inner layer is positioned upon and glue laminated with respect to said first core, and said second fiberboard member of said inner layer is positioned upon and glue laminated with respect to said second core; and wherein said customizable modular panel assembly comprises:

said laminated fiberboard of said first layer, first core, and first fiberboard member of said inner layer being bent at said V-shaped notch, with respect to said laminated fiberboard of said second layer, second core, and second fiberboard member of said inner layer, with said dual-sided tape configured to secure said 45 degree side of said first core to said 45 degree side of said second core to form an L-shape for said panel assembly; and said removable piece of single-sided tape configured to inhibit tearing or splintering; and a plurality of means for mechanically fastening said 45 degree side of said first core to said 45 degree side of said second core.

13. The panel assembly according to claim 12 wherein said three-layer panel assembly comprises a piece of single-sided adhesive tape removably attached to said fiberboard of said outer layer to be opposite said V-shaped notch.

14. The panel assembly according to claim 12 wherein said V-shaped notch comprises a radiused relief groove.

15. The panel assembly according to claim 12 further comprising a softening agent applied to said fiberboard of said rigid outer layer, said softening agent configured to temporarily make said fiberboard pliable.

16. The panel assembly according to claim 12 wherein said fiberboard comprises a fiberboard type from the group of fiberboard types consisting of: particle board, medium-density fiberboard, hardboard, and masonite.

17. The panel assembly according to claim 12 wherein one or more mortises in a first said customizable modular panel assembly receive one or more corresponding tenons fixedly secured within, and protruding from, a second said customizable panel assembly, to join said first and second panel assemblies together.

18. The panel assembly according to claim 17 further comprising two or more nailing strips configured to be fixedly secured to a wall and a ceiling of a building; and wherein said joined customizable panel assemblies are configured to be installed against the wall and the ceiling of the building by being releasably secured to said two or more nailing strips.

19. The panel assembly according to claim 18 wherein said joined customizable panel assemblies are releasably secured to said two or more nailing strips using one-quarter-turn quick release fasteners.

* * * * *